May 23, 1961  T. R. COKER ET AL  2,985,736
REVERSIBLE CONTACT STRUCTURE
Filed June 8, 1959  7 Sheets-Sheet 1

INVENTORS
THEODORE R. COKER
AMOL H. SWANSTROM

BY Roger Sherman Hoar

ATTORNEY

INVENTORS
THEODORE R. COKER
AMOL H. SWANSTROM

BY Roger Sherman Hoar

ATTORNEY

INVENTORS
THEODORE R. COKER
AMOL H. SWANSTROM

BY Roger Sherman Hoar

ATTORNEY

May 23, 1961  T. R. COKER ET AL  2,985,736
REVERSIBLE CONTACT STRUCTURE
Filed June 8, 1959  7 Sheets-Sheet 4
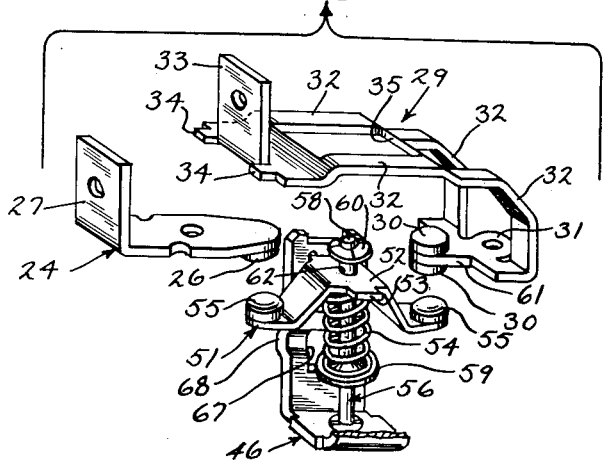
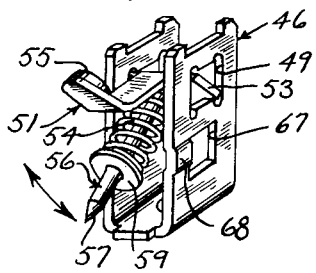
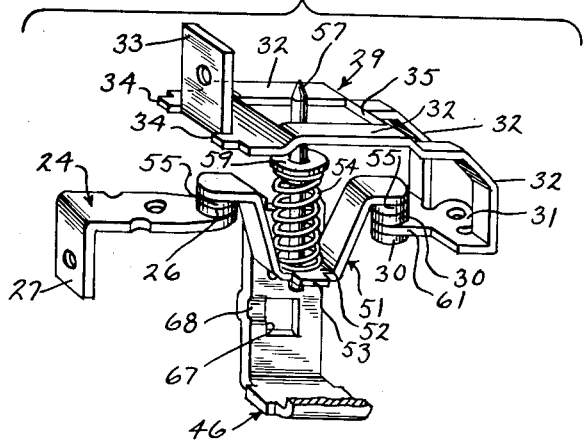
INVENTORS
THEODORE R. COKER
AMOL H. SWANSTROM
BY
Roger Sherman Hoar
ATTORNEY

INVENTORS
THEODORE R. COKER
AMOL H. SWANSTROM

BY Roger Sherman Hoar
ATTORNEY

INVENTORS
THEODORE R. COKER
AMOL H. SWANSTROM

BY

Roger Sherman Hoar

ATTORNEY

United States Patent Office 2,985,736
Patented May 23, 1961

2,985,736
REVERSIBLE CONTACT STRUCTURE
Theodore R. Coker and Amol Harvey Swanstrom, Whitefish Bay, Wis., assignors to Allen-Bradley Company, Milwaukee, Wis., a corporation of Wisconsin
Filed June 8, 1959, Ser. No. 818,659
8 Claims. (Cl. 200—104)

This invention relates to electrical switches and it more specifically resides in a contact structure that has two stationary contacts, and a movable bridging contact for movement into and away from engagement with said stationary contacts, in which structure the bridging contact may be selectively arranged for normally closed contact operation or normally open contact operation, the conversion between one such arrangement and the other taking place without disassembly or removal of the movable bridging contact, or any substitution or addition of parts.

In electrical control circuits for motors, machine tools and similar applications where the switches employed must be readily adaptable for a variety of circuit conditions, it is most desirable to have contact structures that may be arranged for either normally open or normally closed operation without recourse to any substantial revision or rearrangement of the switch elements. In the present invention, the changeover from normally closed to normally open position, or vice versa, is effected simply by temporarily removing one of the stationary contacts, rotating the bridging contact 180 degrees about its bearing in the contact carrier, and restoring the removed stationary contact. In the preferred embodiment the removed stationary contact is restored inverted; in another embodiment it is not inverted.

It is the principal object of the present invention to provide such a switch contact structure as is recited above.

The foregoing and other objects and advantages of this invention will appear from the description to follow. In the description, reference is made to the accompanying drawings, which form a part hereof, and in which there is shown by way of illustration and not of limitation a particular form in which the invention may be embodied.

In the drawings:

Fig. 5 is a view in perspective of contacts and terminals forming a part of the switch, in which the contacts are disposed for a normally open mode of operation.

Fig. 6 is a view in perspective of the contact carrier and bridging contact, the latter being shown in the course of being rotated from normally open to normally closed position, or vice versa.

Fig. 7 is a view in perspective of contacts and terminals forming a part of the switch, in which the contacts are disposed for a normally closed mode of operation.

Figure 12A:
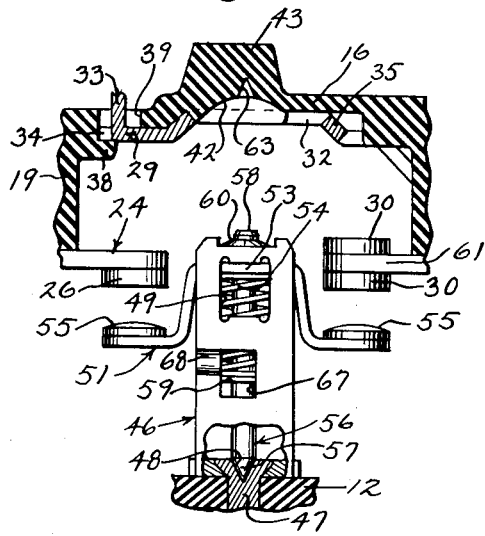

Figs. 12A, B, C, and D are right side elevations of the contacts and associated parts of a normally open switch in four successive positions of being closed by the rising of the actuator proper.

Figure 13A:
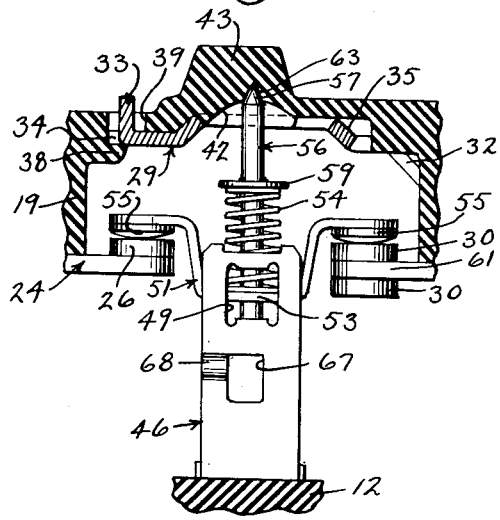

Figs. 13A, B, C, and D are right side elevations of the contacts and associated parts of a normally closed switch in four corresponding successive positions of being opened by the rising of the actuator proper.

Figure 1:
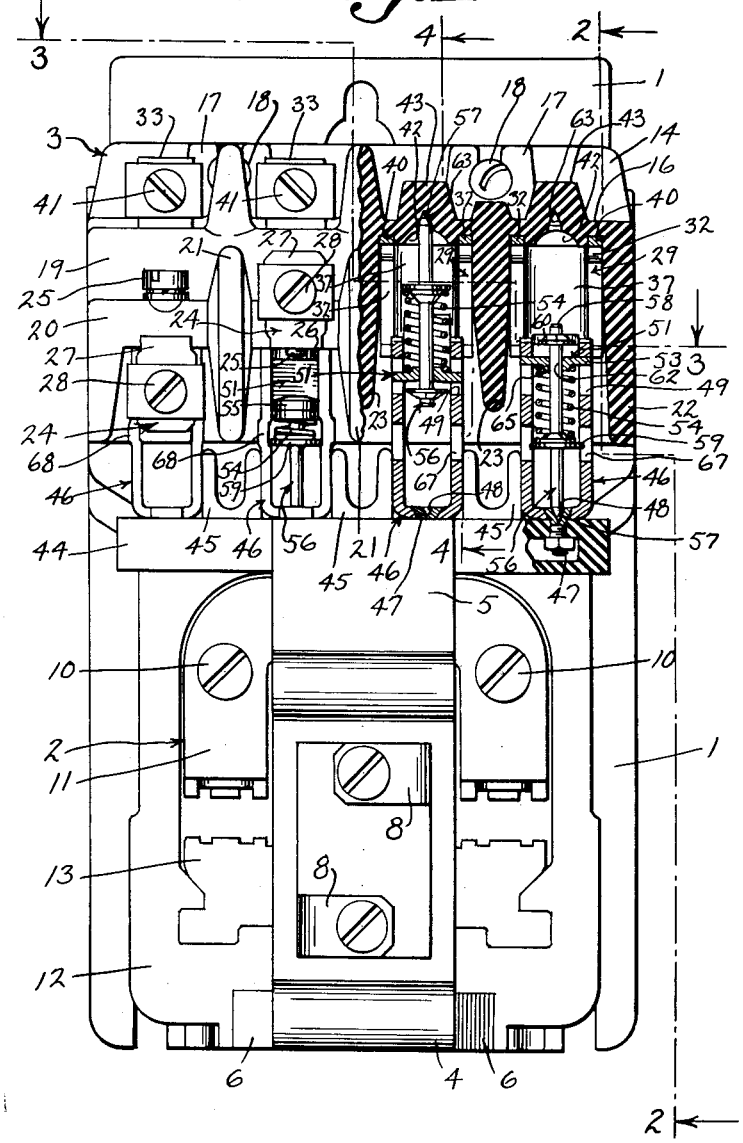
Fig. 1 is a front elevation of an electromagnetically operated multiple switch embodying the invention, with parts of the switch being broken away and in section to show the contact structures within the contact hood. It shows alternately from left to right a normally closed, a normally open, a normally closed, and a normally open switch.
Figure 2:
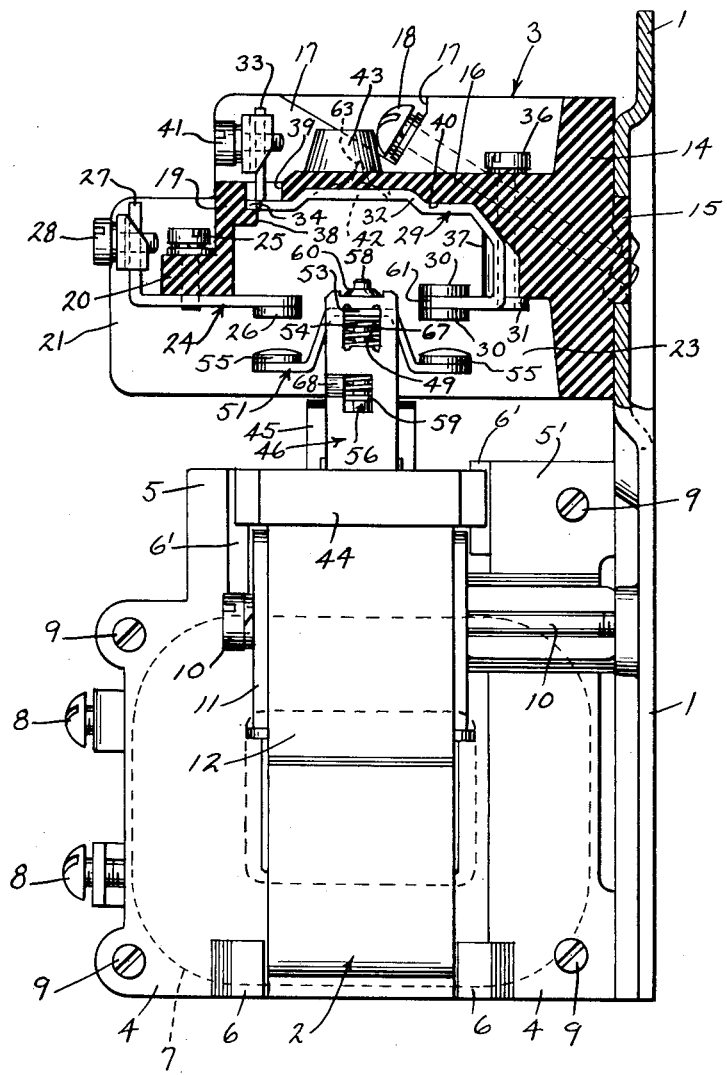
Fig. 2 is a right side elevation of the structure of Fig. 1, with a portion thereof being in section, as viewed through the plane 2—2 designated in Fig. 1. It shows a normally open switch.
Figure 3:
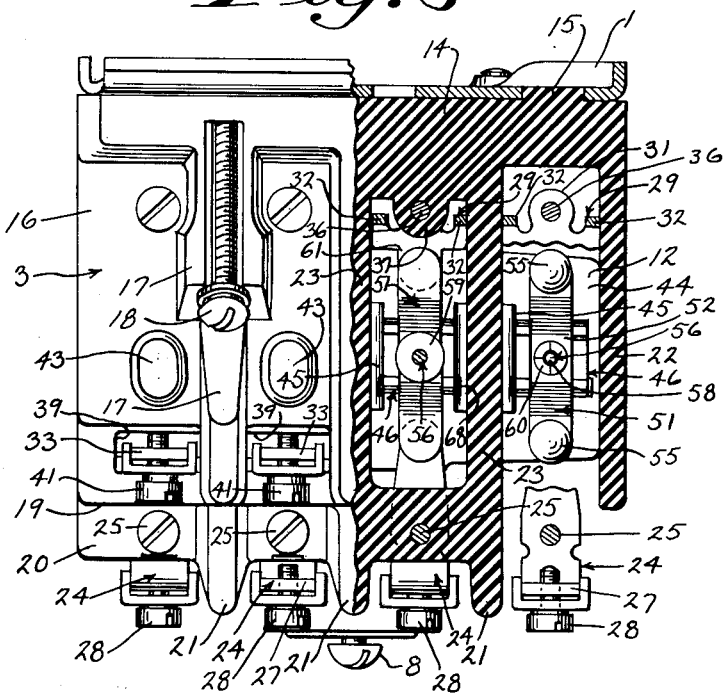
Fig. 3 is a plan view with a portion in section, as viewed through the plane 3—3 designated in Fig. 1.

Referring now to the drawings, and more particularly to Figs. 1, 2, and 3, there is shown a vertical base plate 1, upon which is mounted an electromagnetic actuator assembly 2, and a hood 3 overhanging the actuator assembly 2.

Actuator assembly 2 comprises certain fixed parts and certain movable parts, as will be detailed hereinafter.

The principal fixed part of the actuator assembly is a coil housing 4, enclosing an operating coil 7, which is shown dotted in Fig. 2.

Base plate 1, hood 3, and coil housing 4, which are rigid with each other, will sometimes hereinafter be collectively referred to as the "base."

Suitable terminals 8 for the coil 7 extend from the front of coil housing 4. Housing 4 is made in two cup-like halves to enclose the coil (see dividing line in Fig. 1), held together by four small assembly bolts 9.

Front and rear upward extensions 5 and 5' of housing 4 extend upward from above coil 7. See Fig. 2. Received between these two upward extensions there is an inverted U-shaped magnetic field piece 11, having downwardly extending legs overhanging the sides of coil housing 4. See Fig. 2.

The field piece 11 and coil housing 4 are rigidly held together and to base plate 1 by two large assembly bolts 10, each of which extends, through a hole in the field piece and a trough in the side of the rear of coil housing 4, into base plate 1.

An inverted U-shaped switch actuator proper 12 surrounds, and its legs hang below, field piece 11. It is keyed (as by lateral projections 6 from the bottom of coil housing 4, and by vertical splines 6' on the inner faces of the upward extensions 5 and 5' of that housing) to slide up and down on that housing, and constitutes the principal movable part of actuator assembly 2.

The lower ends of actuator proper 12 are in interlocked connection with the opposite ends of a magnetic armature 13 which extends through the central opening of coil 7. As coil 7 is energized, armature 13 responds by upward movement into engagement with field piece 11. Actuator proper 12, being interlocked with armature 13, moves in unison therewith. The electromagnetic actuator assembly 2 which has been briefly described herein is more fully treated in Letters Patent No. 2,692,314, dated October 19, 1954, and entitled "Electromagnetic Actuators."

It will be seen from Fig. 1 and from the foregoing discussion that the reciprocation of actuator proper 12 is limited to closing and opening the normally unenergized gap between armature 13 and the ends of the legs of field piece 11. This will be alluded to again when discussing Figs. 12A, B, C, and D, and 13A, B, C, and D.

Hood 3, coil housing 4, and actuator proper 12, should each preferably be made of some dielectric material such as a pressed phenolformaldehyde resin.

Figure 4:
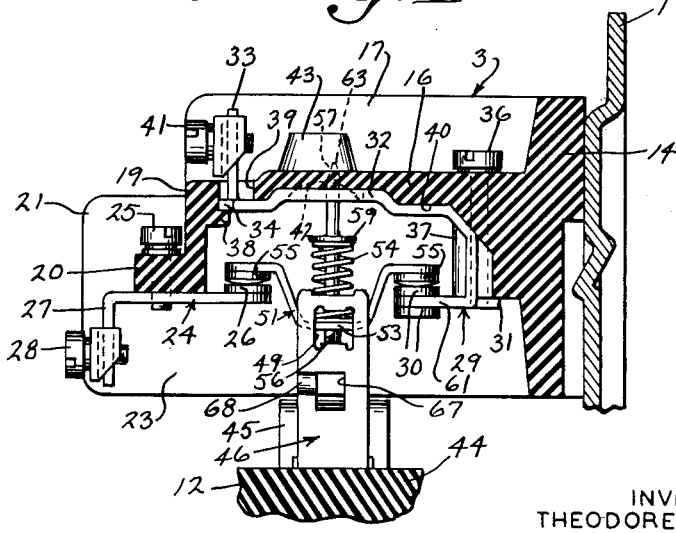
Fig. 4 is a fragmentary right side elevation viewed in section on the plane 4—4 designated in Fig. 1.
Figure 8:
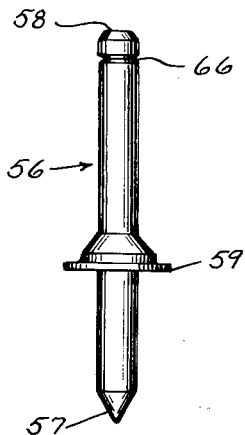
Fig. 8 is an enlarged elevation of the pin.
Figure 9:
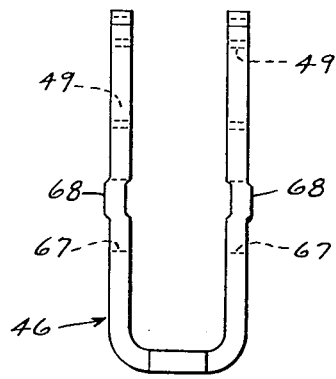
Fig. 9 is an enlarged front elevation of the contact carrier.
Figure 10:
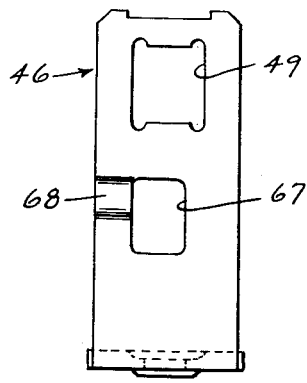
Fig. 10 is a side elevation of the same, to the same scale.
Figure 11:
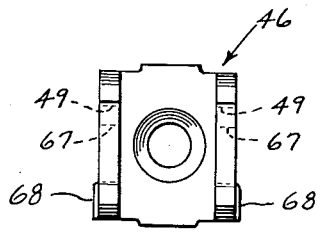
Fig. 11 is a plane view of the same, to the same scale.

Hood 3 has a back wall 14, seen in Figs. 2, 3 and 4, which abuts the upper face areas of the base plate 1, and from the back wall 14 there protrude a pair of bosses 15, one of which is seen in Figs. 2 and 3, that extend into complementary openings in the base plate 1 for orientating the contact hood 3 in proper place. Extending forwardly from the back wall 14 is a roof 16 which is at a level somewhat beneath the upper edge of the wall 14, and dividing the upper face of the roof 16 into small areas is a set of rearwardly and forwardly extending vertical ribs 17. Two of the ribs 17 are each shaped to receive a mounting bolt 18 that passes on a diagonal through the respective rib 17 and through the back wall 14 to emerge for threaded engagement with the base plate 1, to thereby hold the contact hood 3 in place.

At the forward edge of the roof 16 there is a depending front wall 19 having an enlarged forwardly protruding lower lip 20 that extends across the front of the hood 3 to serve as a mounting abutment for a set of stationary contacts to be described. A set of vertical partition ribs 21 extend forwardly from the front wall 19 and its lip 20 to subdivide the space to the immediate front, and each rib 21 is in alignment with one of the ribs 17 to form a continuation thereof. A pair of side walls 22 complete the exterior of the contact hood 3 to thereby provide a hood closed at the front, back, sides and top, and open at the bottom to receive movable contact structure to be described.

A series of vertical fore and aft extending partitions 23 divide the interior of the contact hood 3 into compartments, and the partitions 23 are in alignment and merge with the ribs 21 at the front of the hood 3. Each of the compartments, thus formed within the hood 3, provides a separate housing for a set of contacts or a pole of the switch. In this manner, individual arc chambers are provided for each contact set.

A set of front terminals 24 are fastened to the underside of the lip 20 by attachment screws 25. Each front terminal 24 has thereon a front stationary contact 26 disposed within a chamber of the hood 3, in a position that is a short distance behind the front wall 19. Each front terminal 24 extends forwardly from its contact 26 outwardly from the front of the lip 20 to present a turned connection end 27 that mounts a suitable terminal screw 28, for the purpose of making connection with a lead wire forming a part of a circuit network of which the switch is to be a part. Each front terminal 24 may be positioned with the contact 26 facing downwardly and connection end 27 facing upwardly, as shown in Figs. 2 and 5, in which instance it is arranged for a normally open contact arrangement. Each front terminal 24 may be secured to the lip 20 in the alternative position shown in Figs. 4 and 7, which is inverted from the position of Figs. 2 and 5. This inverted position places the front stationary contact 26 upwardly and the connection end 27 downwardly for a normally closed contact arrangement. The position of the connection end 27 indicates whether the associated contact 26 is arranged for a normally open or normally closed mode of operation, and simple visual inspection of the connection end 27 eliminates any necessity for inspection within the contact hood 3 for determining the contact arrangement.

For each front terminal 24 there is a corresponding rear terminal 29 directly to the rear. Each rear terminal 29 is of a complex configuration, as shown in isometric perspective in Figs. 5 and 7, and has thereon a pair of rear stationary contacts 30 placed one above and one below a contact mounting tab 30' at the lower rear of the terminal. The lower contact 30 serves for a normally open mode of operation and the upwardly facing contact 30 serves for a normally closed mode of operation. Adjacent the rear contacts 30 of the rear terminal 29 is a mounting seat 31 having a threaded opening. Each rear terminal 29 extends upwardly from its seat 31 in the form of a pair of spaced ribs 32. After a short vertical upward extent, the ribs 32 have a forwardly inclined rise, then a forwardly extending run, then another forwardly inclined rise, then another forwardly extending run, and finally a forwardly inclined descent, to merge in the base of a connection end 33. The connection end 33 is disposed vertically, and a pair of toes 34 extend forwardly from each side of the base of the connection end 33. To lend strength to the ribs 32 of each rear terminal 29, a reinforcing cross-piece 35 extends crosswise between the ribs 32 in a position above the contacts 30.

Each rear terminal 29 is held in position within the contact hood 3 by means of an attachment screw 36 that extends through a pilaster 37 standing out from the back wall 14 of the hood 3. The bottom end of each attachment screw 36 is in threaded engagement with the mounting seat 31 of the associated terminal 29 and is drawn up tight to mount the seat 31 firmly against the bottom face of the pilaster 37. The toes 34, at the forward end of each terminal 29, rest upon a ledge 38 formed as a part of the front wall 19, as is shown in Figs. 2 and 4. Each connection end 33 extends outwardly through an opening 39 in the roof 16 of the hood 3 and projects upwardly from the roof 16. The ribs 32 are received in complementary grooves 40 on the underside of the roof 16, as shown in Fig. 1, with the upper sides of the ribs 32 being closely adjacent the underside of the roof 16. With each attachment screw 36 drawing the associated mounting seat 31 firmly against the underside of the associated pilaster 37, and the forward end of each terminal 29 being held in place by both the toes 34 resting upon a ledge 38 and the upper sides of the ribs 32 being closely adjacent the underside of the roof 16, each terminal 29 is firmly and securely held in place. Completing each terminal 29 is a terminal screw 41 threadedly received in the exposed connection end 33, which provides for connecting to lead wires of a circuit network.

The ribs 32 of each rear terminal 29 are spaced laterally from one another to straddle a rounded cavity 42 formed in the underside of the roof 16 medially between the associated front stationary contact 26 and the rear stationary contacts 30. Over this cavity, roof 16 may be reinforced, as by reinforcement 43 shown in Figs. 1, 2, and 4. In the center of cavity 42 there is a shallow socket 63. This socket constitutes a feature of the present invention, as will be explained hereinafter.

A crossbar 44 forms the top of the switch actuator proper 12. A group of integrally molded channel-shaped electrical barriers 45 are disposed along the upper face of the crossbar 44 with the channel of each barrier 45 directly below the lower end of a partition 23 of the hood 3. The barriers 45 function to form orienting seats for a set of movable contact carriers 46. Each carrier 46 is a stamping of generally U-shaped configuration, as seen from the front, comprising a base and parallel spaced arms, and is positioned between two adjacent barriers 45, and is attached by a mounting screw 47 passing through its base and received in the crossbar 44. This screw has in its head an axial socket 48, which is a feature of the present invention as will be explained hereinafter. Each arm of each carrier 46 has near its top a substantially rectangular hole or window 49.

The carriers 46 are preferably of a case hardened steel to reduce wear and to eliminate fragmentary separation of particles that might cause switch failure.

Refer now more particularly to Figs. 5, 6, and 7. A movable bridge 51 is carried by each movable contact carrier 46, and spans the gap between the associated front stationary contact 26 and rear stationary contact 30 with which it is to be engaged. The bridges 51 are preferably case hardened, like the carriers 46, for the same reasons.

Each movable bridge 51 has a dished appearance, as seen from the side, and mounts at its ends contacts 55 which are in alignment with the stationary contacts 26 and 30 for engagement therewith. The central fore-and-aft horizontal portion 52 of each bridge 51 has short side wings 53 that are inserted in the rectangular holes 49 in the sides of carrier 46.

Although advisable, it is not essential that front stationary contacts 26, rear stationary contacts 30, and bridging contacts 55, be distinct elements attached to the ends of front terminals 24, rear terminals 29, and bridge 51, respectively. Accordingly the recital of such contacts in the claims intends such ends as alternative to such distinct elements.

There is a pin 56 one end 57 of which is pointed the other end 58 being blunt. Some distance in from pointed end 57 there is a first shoulder 59, preferably in the form of a washer, brazed on. Adjacent the blunt end 58 there is a second shoulder 60, preferably a split or spring washer or ring in a groove 66 around the pin; or the blunt end could be headed, if the other shoulder 59 be afterwards attached. The terms "pointed" and "blunt" are used herein merely for the purpose of identifying the two ends, although it is preferable for the pointed end to be actually pointed for selective seating in sockets 48 and 63. A compression spring 54 surrounds pin 56, bearing against first shoulder 59 and the central portion 52 of bridge 51. The blunt end 58 of pin 56 projects through a hole 62 punched in said central portion 52, and is secured by second shoulder 60 from coming out of this hole. The draw material 65 resulting from the punching of hole 62 surrounds the hole and serves as a centering seat for the adjacent end of compression spring 54. See Fig. 1.

The operation of the switch will now be discussed.

Each bridge 51 is carried by the movable contact carrier 46 in one of two alternative orientations, depending upon whether the switch unit in question is to be employed for normally open or normally closed operation. This will be explained later herein.

In each of these two alternative orientations the fit between bridge 51 and the sides of upper rectangular windows 49 in carrier 46 is of comparatively small clearance, so that each side wing 53 of the bridge is restricted from forward and backward movement and the adjacent side edges of the central portion 52 of the bridge are restricted from sideward movement. The sides of said rectangular windows 49 thus form guide surfaces which permit limited upward and downward movement of the associated bridge 51, but in which sideward and fore-and-aft movement of the bridge is prevented.

Figs. 12A, B, C, and D illustrate four successive positions of a normally open switch unit, at three substantially equal intervals of one-third the armature travel upward.

First consider Fig. 12A. Pointed end 57 of pin 56 is seated in socket 48 in screw 47, and wings 53 of bridge 51 are seated against the tops of rectangular windows 49, spring 54 being under slight compression, which effects these seatings. The electromagnetic actuator is assumed to be deenergized, armature 13 and switch actuator proper 12 being in their lower position as shown in Figs. 1 and 2. Movable contacts 55 carried by bridge 51 are spaced beneath stationary contacts 26 and 30, and hence are in open circuit position.

Figure 12B:
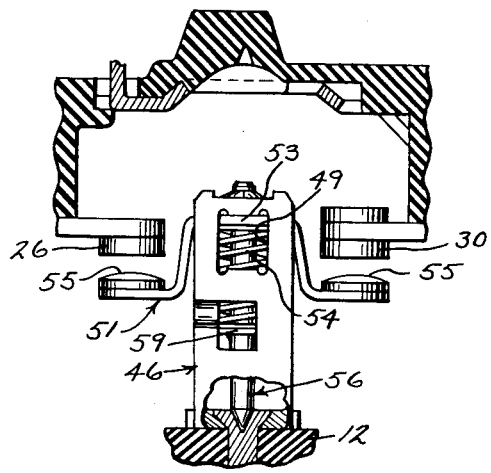

When the electromagnetic actuator 2 is now energized, armature 13 moves upwardly, carrying with it actuator proper 12, and hence carrier 46, and hence pin 56. Spring 54 continues to hold wings 53 of bridge 51 against the top edges of rectangular windows 49, so that the bridge travels upwardly with carrier 46, through the position of Fig. 12B (one-third travel) to the position of Fig. 12C (two-thirds travel) when movable contacts 55, carried by bridge 51, strike fixed contacts 26 and 30, thus closing the circuit.

Figure 12C:
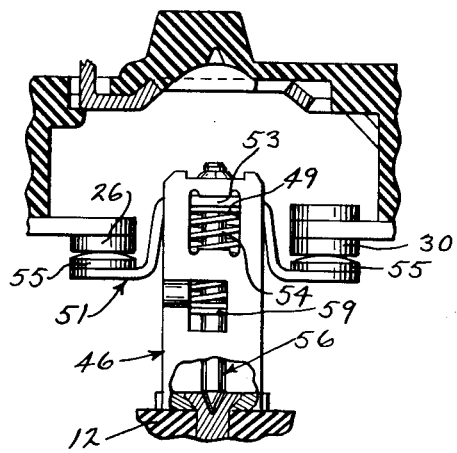
Figure 12D:
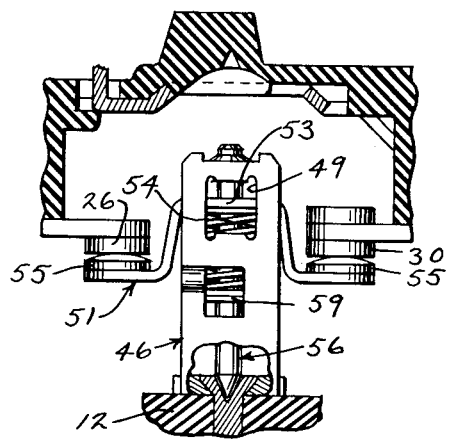

As carrier 46 continues to move upward during the remaining one-third of its travel, to the position of Fig. 12D, then inasmuch as the bridge can rise no further, the top edges of windows 49 will rise above the wings 53, and the continued upward motion of pin 56, acting through its shoulder 59, will compress spring 54, thereby establishing added contact pressure. The switch actuating mechanism has overtraveled the switch.

When the electromagnetic actuator 2 is subsequently deenergized, armature 13 and actuator proper 12 fall. The top edges of windows 49 in contact carrier 46 will likewise descend from the position of Fig. 12D, and strike the side wings 53 of the movable bridge 51 as shown in Fig. 12C. The contacts 55 will then be moved downwardly and out of engagement with the contacts 26 and 30 to achieve successively the positions of Figs. 12B and A.

Figs. 13A, B, C, and D illustrate four successive positions of normally closed switch unit, at the same four times as Figs. 12A, B, C, and D respectively.

First consider Fig. 13A. Movable bridge 51 is inverted and disposed above stationary contacts 26 and 30. Pin 56 is likewise inverted, its pointed end 57 being now inserted in socket 63 in cavity 42. Spring 54 is now above bridge 51. The side wings 53 of bridge 51 are in rectangular windows 49 of carrier 46 about midway down, under the influence of spring 54 which is holding movable contacts 55 firmly against stationary contacts 26 and 30. The electromagnetic actuator is assumed to be deenergized, and so armature 13 and actuator proper 12 are in their lower position as shown in Fig. 1.

Figure 13B:
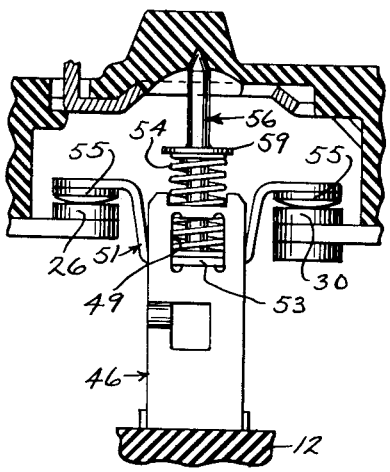
Figure 13C:
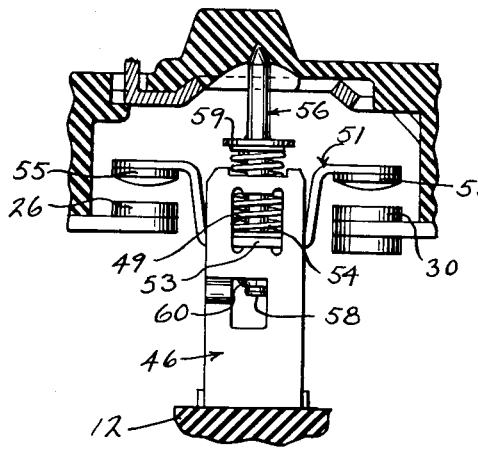
Figure 13D:
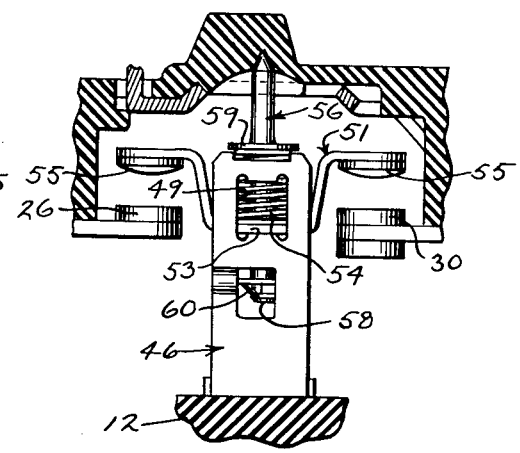

When the electromagnetic actuator 2 is now energized the armature 13 moves upwardly, carrying with it actuator proper 12, and hence carrier 46, until the lower edges of rectangular windows 49 strike wings 53 of bridge 51 in the position of Fig. 13B. Then as carrier 46 continues to move upwardly, it carries bridge 51 with it, through the position of Fig. 13C, to the position of Fig. 13D. The closed circuit has now been opened.

When the electromagnetic actuator 2 is subsequently deenergized, armature 13 falls, and with it fall actuator proper 12, carrier 46, and bridge 51, until movable contacts 55 come into engagement with stationary contacts 26 and 30, as in Fig. 13B, and hence in closed circuit position. Then as carrier 46 continues to move downwardly, the bottom edges of rectangular windows 49 will overtravel below the wings 53, as in Fig. 13A, thus permitting compressed spring 54 acting against the central portion of bridge 51 to apply contact pressure for the closed circuit position just resumed.

It should be understood that the passing of the apparatus from position A to position D, and vice versa, takes place almost instantaneously.

And now there will be explained how to convert the individual switch units from normally open to normally closed, and vice versa.

Assume that the unit is set up as a normally open switch, as shown in Figs. 2, 5, and 12A. Unscrew attachment screw 25, and temporarily remove front terminal 24. Lay the switch on a table with its front up and its bottom toward you. Hold the actuator 2 in unenergized position with the left hand: left index finger against the top 44 of actuator proper 12, and left thumb against the bottom of coil housing 4. Insert the end of a small screw driver between the legs of carrier 46, and pry up on shoulder 59 of pin 56, thus raising the pointed end of the pin out of socket 48, compressing spring 54. Shoulder 59 is wider than the inside distance between the legs of carrier 46, and so protrudes into rectangular holes 67, and bears against the sides of said holes, thus preventing the pin 56 from tipping either forwardly or rearwardly as it is raised. But when shoulder 59 has been pried up until it is level with bulges 68, shoulder 59 will snap out through the bulges. See Fig. 6. Note that wings 53 of bridge 51 rotate in windows 49. Manipulate the pin with the screw driver until its pointed end strikes against the front wall 19 of hood 3. Then with the screw driver push rearwardly against shoulder 59, compressing spring 54, and the pointed end of the pin will clear the protruding lower lip 20 of front wall 19 and slide up into cavity 42, whereupon further manipulation by the screw driver will slide the pointed end of the pin into upper socket 63.

The change from normally open to normally closed is completed by putting back again front terminal 24, with its connection end 27 now down as shown in Figs. 4 and 7.

The above detailed procedure may be summarized as follows. To convert a unit from normally open to normally closed, remove front terminal. Lift pin out of lower socket. Rotate pin forward and up. Seat pin in upper socket. Replace front terminal inverted. Details of manipulation may be varied to suit individual convenience.

Conversion of an individual switch unit from normally closed operation to normally open operation is effected as follows.

Assume that the unit is set up as a normally closed switch as shown in Figs. 4, 7, and 13A. Unscrew attachment screw 25, and temporarily remove front terminal 24. Lay the switch on a table with its front up and its bottom toward you. Hold the actuator 2 in unenergized position with the left hand: left index finger against the top 44 of actuator proper 12, and left thumb against the bottom of coil housing 4. Insert the end of a small screw driver between the legs of carrier 46, and thence between spring washer 60 on pin 56. Press down on washer 60, thus unseating the pin from socket 63. Manipulate the pin with the screw driver, so that the pointed end of the pin swings forwardly and down until it strikes against crossbar 44. Then with the screw driver push rearwardly against shoulder 59, compressing spring 54, until shoulder 59 slides rearwardly through bulges 68 into rectangular holes 67 of carrier 46, and the pointed end of the pin finally seats in lower socket 48.

The change from normally closed to normally open is completed by putting back again front terminal 24, with its connection end 27 up as shown in Figs. 2 and 5.

The above detailed procedure may be summarized as follows. To convert a unit from normally closed to normally open, remove front terminal. Pull down pin out of upper socket. Rotate pin forward and down. Seat pin in lower socket. Replace front terminal inverted. Details of manipulation may be varied to suit individual convenience.

It will be readily evident from the foregoing description that this invention affords a new and useful contact structure for an electrical switching unit, which contact structure has two stationary contacts, and a movable bridging contact for movement into and away from engagement with said stationary contacts, in which structure the bridging contact may be selectively arranged for normally closed contact operation or normally open contact operation, the conversion between one such arrangement and the other taking place without disassembly or removal of the bridging contact, or any substitution or addition of parts.

Now that one embodiment of the invention has been shown and described, and a variation therefrom has been suggested, it is to be understood that the invention is not to be limited to the specific form or arrangement of parts herein shown and described, or suggested.

In one of the claims: hood 3 is generically referred to as a "first mounting element," crossbar 44 is generically referred to as a "second mounting element," the relative motion of crossbar 44 toward and away from hood 3 is generically referred to as "relative reciprocation" of those two elements, the pointed end 57 of pin 56 is generically referred to as the "socket seated end" thereof, and certain parts of carrier 46 which slidingly engage certain parts of bridge 51 are generically referred to as "guide means."

Herein the words "up," "down," "upward," "downward," "forward," "backward," "sideward," "above," "below," "vertical," "fore-and-aft," and similar words of relative position, and direction of motion, are used merely for convenience of description, and (especially in the claims) are not intended as restrictive, wherever equivalent consistent dispositions will suffice.

What is claimed is:

1. An electrical switch, comprising: a first and a second mounting element, subject to limited relative reciprocation, each such element having therein a socket facing the other; means for effecting such reciprocation; a pair of spaced-apart contacts mounted on the first mounting element; a contact bridge, for bridging the gap between said spaced-apart contacts; a pin, one end of which is adapted to be selectively seated in one or the other of the two sockets; spring means associated with the pin, for yieldably biasing the bridge away from the socket-seated end of the pin; and guide means carried by the second mounting element, for guiding the bridge into and out of engagement with the contacts, the bridge being journaled in the guide means for inversion of the bridge and the pin at will, while still retaining the bridge and the pin and the spring means assembled on the second mounting element, whereby the switch is convertible from normally open operation to normally closed operation and vice versa.

2. An electrical switch the combination comprising: a base; a pair of fixed electrical contacts carried by the base and spaced fore-and-aft from each other to present a gap therebetween; a bridge; bridging contacts carried thereby, for opening and closing said gap; a contact carrier for carrying said bridge, mounted for limited reciprocation relative to the base, and biased to move downwardly and against movement upwardly; and means to effect relative movement of the carrier upwardly; the bridge having a central fore-and-aft horizontal portion, and portions to support the bridging contacts at a different level from its central portion, the carrier and the bridge including cooperating guide means, constraining the bridge against sideward and fore-and-aft movement, while permitting limited upward and downward movement of the bridge; the bridge being carried by the carrier selectively in each of two alternative orientations, in one of which orientations the bridging contacts are above and normally in contact with the stationary contacts, and in the other of which orientations the bridging contacts are below and normally out of contact with the stationary contacts; the combination being characterized by the facts that: there is a vertical hole through the central portion of the bridge; and that the combination includes a pin, having a pointed end and a blunt end, and intermediate its ends a first shoulder, and adjacent its blunt end a second shoulder; and that the blunt end of the pin is inserted through the hole in the bridge with the bridging contacts further from the blunt end of the pin than is the central portion of the bridge; and that the central portion of the bridge adjoins the second shoulder; and that there is a compression spring surrounding the pin and extending under initial compression between the first shoulder and the central portion of the bridge normally forcing said central portion against the second shoulder; and that there is in each of the base and the carrier a socket for selectively receiving the pointed end of the pin to produce the two alternative orientations of the bridge; and that the cooperating guide means are such as to permit inversion of the bridge, from one of its selective alternative orientations when the pin is withdrawn from one of its sockets and is rotated end-for-end and inserted in the other of said sockets; such inversion being effected while still retaining the bridge and the pin and the spring assembled in the carrier; whereby the switch is convertible from normally open operation to normally closed operation, and vice versa.

3. An electrical switch according to claim 2, further characterized by the fact that the vertical hole through the central part of the bridge is punched therein, and that the draw material produced by the punching operation surrounds said hole and serves as a centering seat for the adjacent end of the spring.

4. An electrical switch according to claim 2, further characterized by the fact that the carrier includes constraining means cooperating with the first shoulder of the pin, to prevent end-for-end rotation of the pin, except forward, when the pin has been withdrawn from, or is being restored to, the socket in the carrier.

5. In an electrical switch, the combination comprising: a mounting element; stationary contact means supported by said mounting element; an actuator for relative reciprocable movement with respect to said stationary contact means; a movable contact bridge carried by and pivotally related to said actuator for inversion of the bridge, whereby said actuator moves said bridge toward and away from said stationary contact means, and whereby said bridge may be inverted for conversion of the switch from normally open operation to normally closed operation, and vice versa; characterized by the fact that there is a pin assembled with said bridge for movement of the bridge along said pin and for inversion of the pin with the bridge, said pin having a bearing end selectively engageable with said actuator and with said mounting element by inversion of the bridge; and that there is bias means, urging said bridge in a direction along said pin away from the bearing end of said pin.

6. In an electrical switch, the combination comprising: a stationary contact assembly including a first pin socket; an actuator, relatively reciprocable with respect to said stationary contact assembly, and including a second pin socket; a carrier with guide surfaces extending along the direction of relative reciprocable movement; a movable contact bridge held captive by said carrier in sliding engagement with said guide surfaces, and pivotable with respect thereto for selective inversion; a pin connected to said bridge for relative movement of the bridge along the pin and for inversion of the pin together with the bridge, said pin having one end seatable selectively in either of said pin sockets depending upon the position of inversion of the bridge; and a spring carried by said pin, biasing the bridge away from the seated end of the pin.

7. In a movable contact assembly for an electrical switch, the combination comprising: a contact carrier having parallel spaced arms with a window in each arm; a contact bridge having a pair of wings, each wing being inserted in one of said windows for sliding captive engagement, said wings being pivotable within said windows to permit inversion of the bridge with respect to the carrier; a pin extending through the bridge and inverted therewith when the bridge is inverted; and a spring carried by the pin with one end of the spring biasing against the bridge to urge the bridge toward one end of the pin.

8. In an electrical switch, the combination comprising: a contact carrier having a base and a pair of spaced parallel arms rising from the base with a guide surface on each, a first pin socket on the base disposed between the arms; a movable contact bridge captively held by and disposed between said parallel arms in sliding relation to said guide surfaces and pivotable between selective positions of inversion; a mounting element having a second pin socket disposed above said carrier and facing said first pin socket in alignment therewith; stationary contact means supported by said mounting element to be engaged by said bridge; a pin extending through said bridge which pin inverts in position when said bridge is inverted, said pin having one end selectively engageable with said pin sockets; and a spring mounted on the pin urging the bridge away from the seated end of the pin.

References Cited in the file of this patent

UNITED STATES PATENTS

| | | |
|---|---|---|
| 2,773,948 | Pelz et al. | Dec. 11, 1956 |
| 2,859,302 | Schleicher | Nov. 4, 1958 |